(12) United States Patent
Grover

(10) Patent No.: US 6,317,766 B1
(45) Date of Patent: Nov. 13, 2001

(54) FAST QUANTUM MECHANICAL ALGORITHMS

(75) Inventor: Lov K. Grover, Murray Hill, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/184,540

(22) Filed: Nov. 2, 1998

(51) Int. Cl.$^7$ ....................................... G06F 17/14
(52) U.S. Cl. .................................................. 708/400
(58) Field of Search .................... 708/400–410

(56) References Cited

U.S. PATENT DOCUMENTS

| | | | | |
|---|---|---|---|---|
| 5,248,883 | * | 9/1993 | Brewer et al. ................... | 250/292 |
| 5,379,000 | * | 1/1995 | Brewer et al. .................... | 331/3 |
| 5,530,263 | * | 6/1996 | DiVincenzo ...................... | 257/14 |
| 5,768,297 | * | 6/1998 | Shor ................................. | 714/763 |
| 5,793,091 | * | 8/1998 | Devoe .............................. | 257/432 |
| 5,838,436 | * | 11/1998 | Hotaling et al. ................. | 356/450 |
| 5,940,193 | * | 8/1999 | Hotaling et al. ................. | 359/11 |
| 6,081,882 | * | 6/2000 | Gossett ............................ | 712/1 |
| 6,218,832 | * | 4/2001 | Chuang et al. ................... | 324/300 |

* cited by examiner

Primary Examiner—Tan V. Mai
(74) Attorney, Agent, or Firm—Henry T. Brendzel

(57) ABSTRACT

A method for solving many classes of real-world problems with a quantum mechanical system by coaxing the system from a starting state to a desired state that is present in the quantum mechanical system with a probability greater than zero. Moving of the quantum mechanical system toward the desired states is effected by a repeated application of operator $Q \equiv -I_s U^{-1} I_t U$, U is a unitary matrix, $I_s$ is a diagonal matrix that characterizes the starting state of the system with 1's in every position along the diagonal, except at the position corresponding to column s and row s, which represents the starting state, where it is −1. $I_t$ is a similar diagonal matrix that characterizes the desired target state, t. The Q transformation is applied a prescribed number of times, followed by a single transfomation U, yielding the desired target state.

18 Claims, 1 Drawing Sheet

FAST QUANTUM MECHANICAL ALGORITHMS

BACKGROUND

This invention relates to computing and, more particularly, to computing with quantum computers.

Quantum computers were first considered in the 70's and early 80's. In 1980, it was shown that a quantum computer could, in principle, compute anything that could be computed by a classical computer. Indeed, Richard Feynman discovered an example of a quantum mechanical system which seemed very difficult to simulate on a classical computer, but which a quantum computer could easily do in polynomial time. Later, the description of quantum computers was formalized, and a number of examples were discovered in which a quantum computer could solve more efficiently than a classical computer.

At the present time, there are still two major considerations relating to quantum computers: how do you build a quantum computer, and what kinds of algorithms could best utilize the inherent characteristics of such a computer.

Quantum computer hardware is still in its infancy. The number of quantum computer designs that have been reported in the art is quite small. One widely discussed model is that of Cirac and Zoller (Phys. Rev. Lett. 74, 4091, 1995) who showed how to use laser-cooled trapped ions as quantum logic and memory devices. In an ion trap, individual atoms are suspended by electromagnetic forces in an ultra-high vacuum, where they are almost completely de-coupled from their environment. The general principles underlying ion trap operations are found in U.S. Pat. Nos. 5,248,883 and 5,379,000. Other physical systems have also been proposed for quantum logic; for example, nuclear spins in solids. See U.S. Pat. No. 5,530,263. A photon model has been tested in an experiment by Kimble et al and reported on in Phys. Rev. Lett. 75, 4710, 1995. U.S. Pat. No. 5,793,091, issued Aug. 11, 1998, titled "Parallel Architecture for Quantum Computers Using Box Trap Arrays" describes a quantum computer architecture that uses many small quantum channels for frequently performed logic and memory operations, and a few large channels for infrequently performed operations.

More recently, in an article titled "Experimental Implementation of fast quantum searching" Isaac Chuang et al reported in Phys. Rev. Lett. Vol. 80, No. 15, April 1998, on a quantum computer implementation that employs the spins of carbon and hydrogen nuclei in chloroform. This is a significant achievement because, as indicated above, not only is building a quantum computer a challenging task, but employing such a computer effectively to solve a useful problem is equally challenging. The Chuang et al article should go a long way to convince designers of the quantum computer's ultimate usefulness.

The realm of algorithms that are particularly well suited for quantum computers has not been without advances either. In 1994, Peter Shor presented an efficient quantum mechanical algorithm for factorization, that is exponentially faster than any known classical algorithm, Factorization is an important problem because numerous encryption systems rely on the fact that classical computers require a very long time to factor large numbers.

In Jul. of 1997, I published an article titled "Quantum Mechanics Helps in Searching for Needle in a Haystack," in Phys. Rev. Letrs., Vol. 79, No. 2, pp. 325–328, describing an algorithm that is polynomially faster than any classical algorithm. This algorithm finds a desired object in an unsorted database in $o(\sqrt{N})$ steps, as compared to $o(N)$ for the classical search. Other quantum mechanical algorithms for important computer science problems have also been discovered, but there is still no general technique for obtaining efficient quantum algorithms.

SUMMARY

This disclosure presents a general quantum mechanical algorithm and system architecture that efficiently solve many classes of real-world problems. Specifically, it demonstrates that quantum mechanical problems are solved efficiently when any unitary matrix U is employed, and a transformation Q is applied, where $Q=-I_s U^{-1} I_t U$. $I_s$ is a diagonal matrix that characterizes the starting state of the system with 1's in every position along the diagonal, except at the position corresponding to column s and row s, which represents the starting state, where it is −1. $I_t$ is a similar diagonal matrix that characterizes the desired target state, t. The Q transformation is applied a prescribed number of times, followed by a single transformation U, yielding the desired target state.

DETAILED DESCRIPTION

Overview

Figure 1:
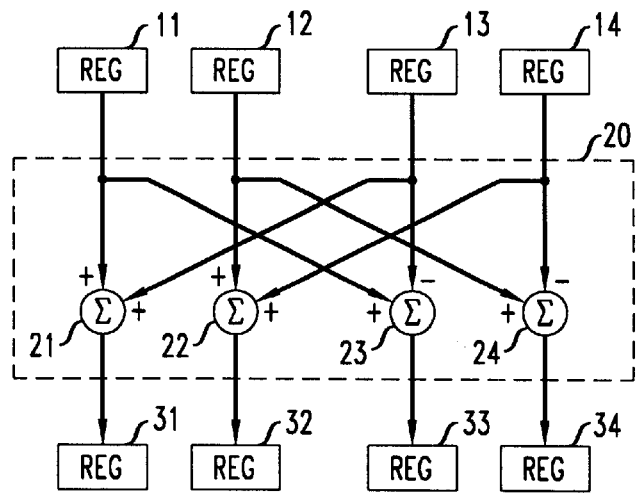
FIG. 1 depicts an arrangement for processing the information in a single quantum bit (information is stored classically and is processed with classical hardware)

Just like classical probabilistic algorithms, quantum mechanical algorithms work with a probability distribution over various states. However, unlike classical systems, the probability vector does not completely describe a quantum system. According to quantum mechanics, the true nature of all objects is wavelike and the complete description of a quantum system requires the specification of both the magnitude as well as the phase of this probability. A quantum mechanical system is usually described by specifying a complex number called the amplitude for each state - this description is called a superposition. The amplitude, being a complex number, has both a magnitude and a phase. The magnitude squared of the amplitude of each state specifies the probability of the system being in that state.

In classical probabilistic systems, the evolution of a system is given by premultiplying the probability vector by a Markov transition matrix. This matrix has constraints that the sum of each column be unity and all the elements be non-negative. These constraints arise from the fact that probability must be conserved. In a quantum mechanical system the state transition matrix acts on the amplitude vector and the conservation of probability leads to the constraint that the state transition matrix be unitary, i.e. the columns of the matrix be orthogonal to each other.

A complex quantum mechanical system is usually designed out of elementary two-state quantum systems.

Each two-state quantum system is called a quantum bit, or a qubit. Quantum mechanical operations that can be carried out in a controlled way are unitary operations that act on a small number of qubits in each step.

A basic operation heretofore employed in quantum computing is the Walsh-Hadamard transformation performed on a single qubit. This is represented by the unitary matrix $$M \equiv \frac{1}{\sqrt{2}}\begin{bmatrix} 1 & 1 \\ 1 & -1 \end{bmatrix}. \qquad (1)$$

A qubit that is at state "1" can be written as the vector [0|0>, 1|1>], and applying the matrix (1) to the superposition yields $$\frac{1}{\sqrt{2}}\begin{bmatrix} 1 & 1 \\ 1 & -1 \end{bmatrix}\begin{bmatrix} 0 \\ 1 \end{bmatrix},$$

or the superposition $$\left(\frac{1}{\sqrt{2}}, -\frac{1}{\sqrt{2}}\right).$$

Similarly, a qubit that is at state "0" can be written as [1|0>,0|1>], and applying the matrix (1) to the superposition yields $$\frac{1}{\sqrt{2}}\begin{bmatrix} 1 & 1 \\ 1 & -1 \end{bmatrix}\begin{bmatrix} 1 \\ 0 \end{bmatrix},$$

or the superposition $$\left(\frac{1}{\sqrt{2}}, \frac{1}{\sqrt{2}}\right).$$

A quantum computer may be designed with words having n qubits and each word having $N=2^n$ basis states. In this disclosure, "state" or "state of the system" means one of the N basis states in which each of the n qubits is either a 0 or a 1. Just as with classical computing, words in a quantum computer can be processed serially or in parallel. When performing operations serially, the state transition matrix of equation (1) above can be employed. When performing operations in parallel, a corresponding transformation may be made with a matrix of dimension $2^n \times 2^n$ with values $$\frac{\pm 1}{\sqrt{N}}$$

in all positions, having columns that are orthogonal to each other (as is the case for all unitary matrices).

Illustratively, the M transformation can be implemented for a single bit (i.e., for a serial arithmetic computer) with classical hardware in the manner described in FIG. 1. A qubit is defined by four registers 11, 12, 13, and 14. These registers store the real and imaginary values of the amplitudes of the 0 and the 1 of the qubit. They can also be arranged to store the magnitude and phase of the 0 and the 1 of the qubit. Processor 20 performs the Hadamard transformation by summing the contents of registers 11 and 13 and placing the sum in register 31, summing the contents of registers 12 and 14 and placing the sum in register 32, subtracting the contents of register 13 from the contents of register 11, and subtracting the contents of register 14 from the contents of register.

Consider a case when the starting state is one of the $2^n$ basis states, i.e. a state described by a general string of n binary digits composed of some 0s and some 1s. The result of performing the transformation M on each qubit will be a superposition of states consisting of all possible n bit binary strings with amplitude of each state being $\pm 2^{n/2}$. This transformation is referred to as the W-H transformation and denoted in the literature by W. See D. Deutsch and R. Jozsa, *Rapid solution of problems by quantum compultation*, Proc. Royal Society of London, A400, 1992, pp. 73–90.

In my aforementioned July 1997 article, I presented an algorithm for performing a database search. The search problem can be expressed as follows. Let a system have $N=2^n$ states, which are labeled $S_1, S_2, \ldots S_N$. Some unique state $S_v$ satisfies the condition $C(S_v)=1$, which represents a match condition, or a "hit". For all other states $j \neq v v$, $C(S_j)=0$, which represents a no match condition, or a "miss". The algorithm first initializes the system to the superposition $(1/\sqrt{N}, 1/\sqrt{N}, \ldots 1/\sqrt{N})$, in which all states are equally probable. Operating in serial arithmetic, this state can be achieved by applying W to each qubit of an input word in a serial fashion, where the starting states of the incoming qubits are all "0". A sequence of alternating operations is performed comprising a selective inversion followed by a diffusion transformation D. D is a transformation described by an N×N matrix where the diagonal terms are $-1+2/N$ and all other terms are $2/N$. After this sequence of operatios, the resulting state is measured. The result will be the state $S_v$ with a probability of at least 0.5.

Figure 2:
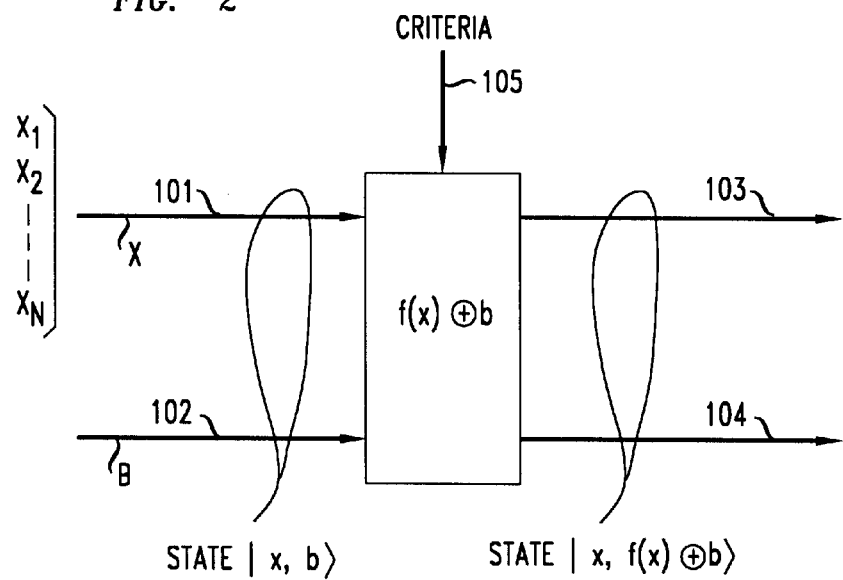
FIG. 2 shows an arrangement for selective inversion of that information in a qubit in a vector of qubits (which was stored classically)

Selective inversion of the phase of the amplitude in certain states is a particular case of selective rotation performed by the rotation matrix (2). It can be effected, for example, with a circuit 100 as shown in FIG. 2 where the input is the information in the quantum which is stored classically. This corresponds to the input applied at input 101 together with the ancilla input bit applied at input 102. The input at line 101 may be a word x, corresponding to n qubits $x_1, x_2, \ldots x_n$ with $2^n$ states and describable by a collection of terms in the form $a_k|c_1 c_2 \ldots c_n>$, where the c's are either 0 or 1, and the ancilla bit, b, at input 102 is in the superposition $$\frac{1}{\sqrt{2}}(|0>, -|1>).$$

Block 110 is responsive to word x, applying a selected function $f(x)$, as provided by lead 105. Presumably $f(x)=1$ for at least some state of the word x, and when such is the case, circuit 101 reverses the amplitude of the ancilla bit of that state. For example, an input word x where n=2 can be described by the superposition $(a_1|00>, a_2|01>, a_3|10>, a_4|11>)$. Viewing the FIG. 2 circuit with the ancilla bit (in the least significant bit position), the input can be described by $$(a_1|00>, a_2|01>, a_3|10>, a_4|11>)\frac{1}{\sqrt{2}}(|0>, -|1>), \text{ or} \qquad (2)$$

$$\frac{1}{\sqrt{2}}(a_1|000>, a_2|010>, a_3|100>, a_4|110>$$

$$-a_1|001>, -a_2|011>, -a_3|101>, -a_4|111>).$$

As stated above, the operation of circuit 110 is to reverse the ancilla bit when $f(x)=1$. If, for example, $f(x)=1$ when x is at state |10>, then the ancilla bit in the third and seventh term is reversed, yielding $$\frac{1}{\sqrt{2}}(a_1|000>, a_2|010>,$$

$$a_3|101>, a_4|110> -a_1|001>, -a_2|011>, -a_3|100>, -a_4|111>)$$

Reversing the positions of the third and seventh terms, the above can be written as $$\frac{1}{\sqrt{2}}(a_1|000>, a_2|010>, -a_3|100>, a_4|110>, \qquad (3)$$

$$-a_1|001>, -a_2|011>, a_3|100>, -a_4|111>)$$

or $(a_1|00>, a_2|01>, -a_3|10>, a_4|11>)\frac{1}{\sqrt{2}}(|0>, -|1>)$.

When the least significant qubit is ignored, what is left is $(a_1|00>, a_2|01>, -a_3|10>, a_4|11>)$. Note the reversal of amplitude of the $|10>$ state, which was the intended result.

C. H. Bennett in "Space-Time Trade-Off in Reversible Computing," *SIAM Journal of Computing*, vol. 18, pp. 766–776, 1989 proved that it is possible to design a quantum mechanical circuit to evaluate any function $f(x)$ that can be evaluated classically with comparable hardware. Since the following employs the selective reversal circuit on the vector of $2^n$ states, the FIG. 2 embodiment might best be implemented by converting words of n qubits into vectors of $2^n$ states, and dealing with the $\alpha_k$ coefficients as outlined above.

Amplitude Amplification

Let each point of the domain of $f(x)$ be mapped to a state t, which is the target state. It is assumed that the function $f(x)$ is non-zero at the point corresponding to state t. The object is to get the system into the t-state. Assume that we have at out disposal a transformation U that is unitary and we start with the system in some state s. If we apply U to s, the amplitude of state t is $U_{ts}$, which means that $|U_{ts}|^2$, is the probability of a system at state s would, upon application of operator U, reach state t. Viewing this as a classical situation where the probability of success (reaching state t) is $|U_{ts}|^2$, one would conclude that the expected number of repetitions before a single success is proportional to $1/|U_{ts}|^2$.

The following discloses a process whereby it is possible to reach state t in only $o(1/|U_{ts}|)$ steps. This leads to a sizable improvement in the number of steps if $|U_{ts}|<<1$.

Denote the unitary operation that inverts the amplitude in a single state x by $I_x$. In matrix notation, this is the diagonal matrix with all diagonal terms equal to 1, except the term along the diagonal in column (and row) x, which is equal to $-1$. That is, in a system where words are n qubits long, and each word can be in a superposition of $2^n$ states, the matrix $I_x$ is a $2^n \times 2^n$ diagonal matrix with 1's in every position along the diagonal, except at position xx, where it is $-1$. Let $v_x$ denote a column vector which has all terms zero, except for the $x^{th}$ term which is unity; and consider the following unitary operator $$Q = -I_s U^{-1} I_t U. \qquad (4)$$

As an aside, the notations used herein, in conformance with the notions used in most quantum mechanics texts, AB denotes a sequence of operation B followed by operation A. Thus, $-I_s U^{-1} I_t U$ denotes first U, then $I_t$, then $U^{-1}$, and lastly $-I_s$. It may be noted that since U is unitary, $U^{-1}$ is equal to its adjoint, i.e. its conjugate transpose.

The following shows that the operator Q preserves the two dimensional vector space spanned by $v_s$ and $(U^{-1}v_t)$.

First, consider the action of Q on the vector $v_s$: By the definition of Q, this equals $-I_s U^{-1} I_t U v_s$. Since $v_x v_x^t$ is an N×N square matrix of all whose terms are zero, except the xx term which is 1, it follows that $I_t = I - 2v_t v_t^T$, and $I_s = I - 2v_s v_s^T$, yielding $$Qv_s = -(I - 2v_s v_s^T)U^{-1}(I - 2v_t v_t^T)Uv_s \qquad (5)$$

$$= -(I - 2v_s v_s^T)U^{-1}Uv_s + 2(I - 2v_s v_s^T)U^{-1}(v_t v_t^T)Uv_s$$

Using the fact that: $v_x^T v_s \equiv 1$ it follows that $$Qv_s \equiv v_s + 2(I - 2v_s v_s^T)U^{-1}(v_t v_t^T)Uv_s. \qquad (6)$$

Simplifying the second term of (6) by the following identity: $v_t^T U v_s \equiv U_{ts}$ and the consequent identity $v_s^T U^{-1} v_t \equiv U_{ts}^*$, which follows from the fact that U is unitary and so its inverse is equal to its adjoint, yields $$Qv_s = v_s(1 - 4|U_{ts}|^2) + 2U_{st}(U^- v_t). \qquad (7)$$

Next, consider the action of the operator Q on the vector $U^{-1}v_t$: Using the definition of Q and carrying out the algebra yields:

$$Q(U^{-1}v_t) \equiv -I_s U^{-1} I_t U(U^{-1}v_t) \qquad (8)$$

$$= -I_s U^{-1} I_t v_t = I_s U^{-1} v_t$$

Writing $I_s$ as $1 - 2v_s v_s^t$ and $v_s^T U^{-1} v_t \equiv U_{ts}^*$ yields $$Q(U^{-1}v_t) = (U^{-1}v_t) - 2v_s v_s^T(U^{-1}v_t) \qquad (9)$$

$$= (U^{-1}v_t) - 2U_{ts}^* v_s.$$

Equations (7) and (9) may be written as:

$$Q\begin{bmatrix} v_s \\ U^{-1}v_t \end{bmatrix} = \begin{bmatrix} (1-4|U_{ts}|^2) & 2U_{ts} \\ -2U_{ts}^* & 1 \end{bmatrix}\begin{bmatrix} v_s \\ U^{-1}v_t \end{bmatrix}, \qquad (10)$$

from which it can be seen that the operator Q transforms any superposition of the vectors $v_s$ and $U^{-1}v_t$ into another superposition of the two vectors, thus preserving the two dimensional vector space spanned by the vectors $v_s$ and $U^{-1}v_t$.

Effectively, the Q operator rotates each vector in the space ($v_s$ being the abscissa and $U^{-1}v_t$ being the ordinate) by approximately $2|U_{ts}|$ radians. Since $v_s$ and $U^{-1}v_t$ are almost orthogonal, in approximately $$\frac{\pi}{4|U_{ts}|}$$

applications, it transforms $v_s$ into $U^{-1}v_t$. Viewed another way, when applying operator Q some number times, $\eta$, to equation (6), the result of $Q_1 Q_3 \ldots Q_\eta v_s$ can be expressed by $\alpha_s v_s + \alpha_t U^{-1}v_t$, and it can be shown that $\alpha_s = \cos(2\eta|U_{ts}|)$ and $|\alpha_t| = |\sin(2\eta|U_{ts}|)|$.

Hence, if $$\eta = \frac{\pi(1+2k)}{4|U_{ts}|},$$

where k is an integer we get the superposition $U^{-1}v_t$, from this with a single application of U we can get $v_t$. Of course, the smallest value of $$\eta \text{ is } \frac{\pi}{4|U_{ts}|}.$$

For example, if $|U_{ts}|=0.000123$, the smallest value of $$\eta \text{ is } \frac{\pi}{4 \times 0.000123},$$

which is approximately 6385.3. Performing the iteration 6385 times yields $|\alpha_t|=|\sin(2 \times 6385 \times 0.000123)|=1$. Correspondingly, $\alpha_s=0$.

The above demonstrates that in $$O\left(\frac{1}{|U_{ts}|}\right)$$

steps, we can start with the s-state and reach the target state t with certainty.

Figure 3:
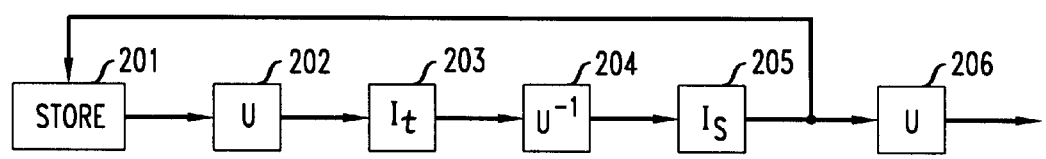
FIG. 3 illustrates an arrangement for applying operator Q a selected number of times, followed by application of operator U, which coaxes a quantum mechanical system from a starting state to a desired target state(as in FIG. 1, information is stored classically and is processed with classical hardware).

One embodiment that conforms to the above teachings is presented in FIG. 3. This embodiment of the algorithm can be implemented with classical circuitry, but it should be understood that the algorithm can also be implemented with systems that truly operate with quantum states, such as demonstrated in the aforementioned Chuang et al article. In FIG. 3, element 201 is the information store upon which the operations are performed. In classical computing terms, it may be the database which contains data about which some information is to be extracted. In quantum computing terms, it may be an element that is in a superposition of quantum states (or, effectively, stores a plurality of quantum states). The information to be derived about the data stored in element 201 can vary, of course. A user of the FIG. 3 system may be interested in whether a particular piece of data is found in element 201, a user may be interested in the median of the data in element 201, etc.

The information contained in element 201 is made available to transform element 202, which applies thereto the transform U. The output of element 202 is applied to transform element 203, which performs the transformation $I_t$. It is noted that this element receives the criteria that are supplied to the FIG. 3 system to induce it to reach a certain state. In the case of a search algorithm, this will be the search criteria.

The output of element 203 is applied to transform element 204 which performs the transformation $U^{-1}$, and the output of element 204 is applied to transform element 205 which performs the transformation $I_s$. The output of element 205 is fed back to element 201 for storage, basically modifying the contents of element 201, and the process repeats a number of times, on the order of $$\left(\frac{1}{|U_{ts}|}\right).$$

Following the prescribed number of repetitions, the output of element 205 corresponds to $U^{-1}v_t$, and is applied to transformation element 206 which applies the transformation U and, thereby, obtains the desired result. This result can be utilized immediately, or it can be re-entered into element 201.

The above derivation easily extends to the case when the amplitudes in states, s and t, instead of being inverted by $I_s$ and $I_t$, are rotated by an arbitrary phase. However, the number of operations required to reach t will be greater. Given a choice, it would be clearly better to use the inversion rather than a different phase rotation. Also the analysis can be extended to include the case where $I_t$ is replaced by $Y_t=V^{-1}I_tV$, where V is an arbitrary unitary matrix. The analysis is the same as before but instead of the operation U, we will now have the operation Z=VU. This is the same as replacing U by X=VU.

An interesting feature of the above analysis is that U can be any unitary transformation. Also, the states s and t can be any two basis states. Clearly, these facts can be used to design algorithms where U is a transformation in a quantum computer.

The following presents a number of illustrative realizations that address particular, important, real-world problems. The first three are search-type applications, the next two are statistical applications. Additional applications are presented in L. K. Grover, *Quantum search on structured problems*, presented at the $1^{st}$ NASA Conference on quantum computation and quantum communication, Palm Springs, Calif., February 1998.

The general approach that is used in each of the algorithms is to reduce the problem to one of getting the system into a state t. A unitary transform U and the initial state s are selected, and $U_{ts}$ is calculated. By the above analysis, it follows that if we start with initial state s and carry out $$O\left(\frac{1}{|U_{ts}|}\right)$$

repetitions of the operation sequence $-I_sU^{-1}I_tU$, followed by a single application of U, there is an appreciable amplitude of the system reaching the t-state.

(i) Exhaustive search starting from the $\bar{0}$ state

The $N=2^n$ states to be searched are represented by n qubits. In case the starting states s is the $\bar{0}$ state and the unitary transformation U is chosen to be W, then $U_{ts}$ for any target state $$t \text{ is } \frac{1}{\sqrt{N}}.$$

For a system with N states, W is a $2^n \times 2^n$ matrix with values $$\frac{\pm 1}{\sqrt{N}}$$

in all positions, and the columns are orthogonal to each other (as is the case for all unitary matrices).

As indicated above, the process stars with $\bar{0}$ state and carries out repeated operations of $Q=-I_sU^{-1}I_tU$. That is, the system starts with an input, applies the unitary transformation U in a circuit akin to the circuit depicted in FIG. 1, and applies the result to a circuit that performs the transformation $I_t$. This is a circuit as depicted in FIG. 2, where the searching criteria are places such that a state that corresponds to the desired state causes $f(x)$ to equal 1. The output of this transformation is again applied to a circuit akin to the circuit of FIG. 2 to perform the $U^{-1}$ transformation, and the output of that transformation is applied to a circuit that performs the transformation $I_s$. In this case, $$I_s = I_{\bar{0}} = \begin{bmatrix} -1 & 0 & \cdots & 0 \\ 0 & 1 & \cdots & 0 \\ \vdots & \vdots & \ddots & \vdots \\ 0 & 0 & \cdots & 1 \end{bmatrix} \quad (11)$$

With $U^{-1}=U=W$ and s as the $\bar{0}$ state, Q becomes $Q = -I_{\bar{0}} W I_t W$. Hence, the operation sequence is $$(-I_{\bar{0}} W I_t W)(-I_{\bar{0}} W I_t W)(-I_{\bar{0}} W I_t W) \quad (12)$$

By rearranging parentheses and shifting minus signs, one can obtain $$(-I_{\bar{0}} W I_t)[-(W I_{\bar{0}} W)(I_t)][-(W I_{\bar{0}} W I_t W)] \quad (13)$$

which includes repetitions of $(-W I_{\bar{0}} W)(I_t)$.

The operation sequence $-W I_{\bar{0}} W$ is simply the inversion about average operation, as demonstrated by my aforementioned July 1997 publication. To see this, note that $I_{\bar{0}}$ equals $$I - 2 v_{\bar{0}} v_{\bar{0}}^T$$

and, therefore, for any vector $\bar{x}$, $$-W I_{\bar{0}} W \bar{x} = -W(I - 2 v_{\bar{0}} v_{\bar{0}}^T) W \bar{x} = -\bar{x} + 2 W v_{\bar{0}} v_{\bar{0}}^T W \bar{x}. \quad (14)$$

It is easily seen that $W v_{\bar{0}} v_{\bar{0}}^T W \bar{x}$ is another vector, each of whose components is the same and equal to A, where $$A \equiv \frac{1}{N} \sum_{i=1}^{N} x_i$$

(the average value of all components). Therefore, the $i^{th}$ component of $-W I_{\bar{0}} W \bar{x}$ is simply $(-x_i + 2A)$. This may be written as $A + (A - x_i)$, i.e. each component is as much above (below) the average as it was initially below (above) the average, which is precisely the inversion about average.

(ii) Exhaustive search starting from an arbitrary basis state

In the case where U is chosen as the W-H transform W, the matrix element $U_{ts}$ between any pair of states s and $$t \text{ is } \pm \frac{1}{\sqrt{N}}.$$

Therefore, the search algorithm can start with any of the $N=2^n$ basis states as the initial state s, and the procedure disclosed above yields an algorithm to reach state t in $$O\left(\frac{1}{|U_{ts}|}\right).$$

i.e. $o(\sqrt{N})$, iterations. Therefore, instead of starting with $\bar{0}$ state, as in (i), we could equally well start with any basis state s, and repeatedly apply the operation sequence $Q = -I_s W I_t W$ to obtain an equally efficient $o(\sqrt{N})$ algorithm.

The dynamics is similar to (i); only there is no longer the convenient inversion about average interpretation.

(iii) Search when an item near the desired state is known

When an n bit word is specified and the desired word differs from the specified word in exactly k bits, the effect of this constraint is to reduce the size of the solution space. One way of making use of this constraint, would be to map this to another problem which exhaustively searched the reduced space using (i) or (ii). However, such a mapping would involve additional overhead. This section present a different approach which also carries over to more complicated situations.

Instead of choosing U as the Walsh-Hadamard transform, as is the choice in (i) and (ii), U is tailored to the problem under consideration. The starting state s is chosen to be the specified word, and the operation U consists of the transformation $$\begin{bmatrix} \sqrt{1 - \frac{1}{\alpha}} & \frac{1}{\sqrt{\alpha}} \\ \frac{1}{\sqrt{\alpha}} & -\sqrt{1 - \frac{1}{\alpha}} \end{bmatrix}, \quad (15)$$

applied to each of the n qubits ($\alpha$ is a variable parameter yet to be determined). Note that if $\alpha$ is 2, we obtain the W-H transform. Calculating $U_{ts}$, it follows that $$|U_{ts}| = \left(1 - \frac{1}{\alpha}\right)^{\frac{n-k}{2}} \left(\frac{1}{\alpha}\right)^{\frac{k}{2}}$$

(equal in n-k bits and differs in k bits). This is maximized when $\alpha$ is chosen as $n/k$, and then $$\log |U_{ts}| = \frac{n}{2} \log \frac{n-k}{n} - \frac{k}{2} \log \frac{n-k}{k}.$$

Now, repeating $$o\left(\frac{1}{|U_{ts}|}\right)$$

times the sequence of operations $-I_s U^{-1} I_t U$, followed by a single application of U yields the desired result.

The size of the space being searched in this problem is $^nC_k$ which is equal to $$\frac{n!}{n-k!k!}.$$

Using Stirling's approximation of log $n! \approx n\log n - n$, it follows that $$\log {^nC_k} \approx n \log \frac{n}{n-k} - k \log \frac{k}{n-k}.$$

Comparing this to the number of steps required by the algorithm, we find that the number of steps in this algorithm, as in (i) and (ii), varies approximately as the square-root of the size of the solution space being searched.

(iv) Estimating the median to a precision $\epsilon$

Problem: Assume that we are given $N=2^n$ values between 0 and 1 denoted by $x_0, x_1, \ldots x_{N-1}$ and a certain threshold $\theta$. Let $\Gamma$ denote the fractional difference in the number of values above and below $\theta$, i.e. the number of values below $\theta$ is $N(1-\epsilon)/2$. Given the bound $|\epsilon| < 2\epsilon_0$, the task is to find an estimate $\epsilon_e$ such that $\|\epsilon_e\| - \|\epsilon\| < \epsilon_0/4$.

If we can solve the above problem in $o(1/\epsilon_0)$ steps, then it is possible to iterate with different thresholds and estimate the median to a precision $\epsilon$ in $o(1/\epsilon_0)$ steps.

Classically one needs $\Omega(1/\epsilon^2)$ steps to estimate the median with a precision of $\epsilon$. (All bounds in this and the next example are up to polylogarithmic factors).

Solution: The basic idea is to devise a unitary operation U due to which the amplitude in a t-state comes out to be proportional to the statistic to be estimated. By repeating the operation $-I_sU^{-1}I_tU$, and appropriate number of times, the probability in the t-state is boosted to the point that it can be estimated by carrying out the experiment a few times.

Consider an $N=2^n$ state quantum system represented by n qubits, and associate a value $x_\alpha$ with each state, $S_\alpha$. Next consider the unitary transform R that is a selective inversion operation such that when the value $x_\alpha$ associated with the state $S_\alpha$ is smaller than the threshold $\theta$, the amplitude in $S_\alpha$ is inverted.

Start the system in the $\overline{0}$ state and consider the unitary operation U=WRW. It is easily seen that after U. the amplitude of the system being in the $\overline{0}$ state is $\epsilon$. Also, note that $U^{-1}=W^{-1}R^{-1}W^{-1}=WRW$. Therefore, it follows that after $o(1/\epsilon_0)$ repetitions of $Q=-I_{\overline{0}}U^{-1}I_{\overline{0}}U$, followed by a single application of U, the amplitude in the $\overline{0}$ state reaches $\epsilon/4\epsilon_0$. Now, if a measurement is made with projects the system onto one of its basis states, the probability of getting $\overline{0}$ is $(\epsilon/4\epsilon_0)^2$. It follows from the central limit theorem that by repeating this experiment o(M) times, it is possible to estimate $$\left|\frac{\epsilon}{\epsilon_0}\right|$$

with a precision of $$\frac{1}{\sqrt{M}},$$

and hence $|\epsilon|$ with a precision $$\frac{\epsilon_0}{\sqrt{M}}.$$

By appropriately choosing M, it is possible to estimate $|\epsilon|$ within an error bound of $\epsilon_0/4$.

(v) Estimating the mean to a precision $\epsilon$

Problem: Assume that we are given $N=2^n$ values denoted by $x_0,x_1,\ldots x_{N-1}$, each $x_\alpha$ lies in the range $(-0.5, 0.5)$. The task is to estimate the mean (denoted by $\mu$) to a specified precision $\epsilon$.

Classically this would take $\Omega(1/\epsilon^2)$ steps. The best known quantum mechanical algorithm takes $o(1/\epsilon^{1.5})$ steps. Employing the principles of this invention, however, a simple $o(1/\epsilon)$ step quantum mechanical algorithm (up to polylogarithmic factors) will yield the desired result.

Solution: Start with a relatively large $\epsilon_0$ which is chosen so that $|\mu|<\epsilon_0$. Carry out the following loop (i) ... (iii):

(i) Estimate $\mu$ with a precision of $\epsilon_0$, i.e. find an estimate $\mu_e$ such that $|\mu_e-\mu|<\epsilon_0/2$. This step is described in the "Main algorithm" below.

(ii) Shift each of the numbers by the newly estimated mean, i.e. $x_\alpha=x_\alpha-\mu_e$.

(iii) If $\epsilon_0>\epsilon$, replace $\epsilon_0$ by $\epsilon_0/2$ and go to (i). Otherwise, stop.

The mean may be estimated as the sum of the estimated $\mu_e$ in each iteration of step (i) of the loop.

Main algorithm: The heart of the above algorithm is step (i) of the above loop, i.e. estimating $\mu$ with a precision of $\epsilon_0$ when $|\mu|<\epsilon_0$. Consider a $(2^{n+1}+1)$ state quantum mechanical system represented by (n+2) qubits with the following encoding for the states: $S_0 S_1 \ldots S_{N-1}$ (first two bits are 00, next n bits indicate the $S_\alpha$ state), $R_0 R_1 \ldots R_{N-1}$ (first two bits are 01, next n bits indicate the $R_\alpha$ state), and Q (first bit is a 1, the next (n+1) bits are zero).

The $S_\alpha$ states are the computational states, for each $S_\alpha$ state there is an $R_\alpha$ state, also there is a single Q state. Each state is encoded by (n+2) qubits as shown above.

Associate the value $x_\alpha$ with each of the $R_\alpha$ and $S_\alpha$ states. We need the following 4 unitary operations in this algorithm (these are denoted by $M_1, M_2, R_1$ and $W_1$.) It may be verified that these are indeed valid unitary operations and, with the above encoding, they require operations on only a few qubits at a time.

$M_1$ If in state $S_0$: go to Q with an amplitude of 1/2, stay in $S_0$ with an amplitude of $\sqrt{3}/2$;

if in state Q: go to $S_0$ with an amplitude of 1/2, stay in Q with an amplitude of $-\sqrt{3}/2$;

if in any other state: stay in the same state.

$M_2$ If in state $S_0$: go to Q with an amplitude of $1/\sqrt{2}$, stay in $S_0$ with an amplitude of $1/\sqrt{2}$;

if in state Q: go to $S_0$ with an amplitude of $-1/\sqrt{2}$, stay in Q with an amplitude of $1/\sqrt{2}$;

if in any other state: stay in the same state.

$R_1$ If in state $S_\alpha$: go to $R_{60}$ with an amplitude of $$\sqrt{\frac{2}{3}-\frac{4}{3}x_a^2},$$

stay in $S_\alpha$ with an amplitude of $$\left(\frac{1}{\sqrt{3}}+\frac{2ix_a}{\sqrt{3}}\right);$$

if in state $R_\alpha$: got to $S_\alpha$ with an amplitude of $$\sqrt{\frac{2}{3}-\frac{4}{3}x_a^2},$$

stay in $R\alpha$ with an amplitude $$\left(-\frac{1}{\sqrt{3}}+\frac{2ix_a}{\sqrt{3}}\right);$$

if in any other state: stay in the same state.

$W_1$ If in state $S_\alpha$: carry out the W-H transform on the $S_\alpha$ states;

if in any other state: stay in the same state.

It is easily shown that if we start with the $S_0$ state and carry out the operation U, where U is defined as $M_1W_1R_1W_1M_2$, then the amplitude in the $S_0$ state will be $$\frac{i\mu}{\sqrt{2}}.$$

As in the median estimation, (iv), $U^{-1}$ is the product of the inverses of the same matrices as U, but in the opposite order. By the above analysis, it follows that: By $$o\left(\frac{1}{\epsilon_0}\right)$$

repetitions of Q where $Q=-I_{S_0}U^{-1}I_{S_0}U$, followed by a single application of U, the amplitude in the $S_0$ state becomes $$\frac{i\mu}{\sqrt{2\varepsilon_0}}.$$

Now if a measurement is made which projects the system onto one of its basis states, the probability of getting the $S_0$ state is $$\frac{1}{2}\left(\frac{\mu}{\varepsilon_0}\right)^2.$$

It can be shown by the central limit theorem that by repeating this entire experiment o(M) times, it is possible to estimate $\mu/\varepsilon_0$ with a precision of $$\frac{1}{\sqrt{M}}.$$

By an appropriate choice of M, it is possible to estimate $\mu$ within an error bound of $\varepsilon_0/2$.

(vi) Enhancing General Quantum Mechanical Algorithms

The framework disclosed herein can be used to enhance the results of any quantum mechanical algorithm. Assume there is a quantum mechanical algorithm Q due to which there is a finite amplitude $Q_{ts}$ for transitions from the starting state s to the target state t. The probability of being in the state t is hence $|Q_{ts}|^2$, and it would normally take $$\Omega\left(\frac{1}{|Q_{ts}|^2}\right)$$

repetitions of Q to get a single observation of state t. Since the quantum mechanical algorithm Q is a sequence of $\eta$ elementary unitary operations: $Q_1 Q_2 \ldots Q_\eta$, it is itself a unitary transformation. Also, $Q^{-1} = Q_\eta^{-1} Q_{\eta-1}^{-1} \ldots Q_1^{-1}$. The inverse of any elementary unitary operation on a small number of qubits is another elementary unitary operation on the same qubits and can hence be synthesized. Applying the abovedisclosed analysis, it follows that by starting with the system in the s state and repeating $$\Omega\left(\frac{1}{|Q_{ts}|}\right)$$

times the sequence of operations $-I_s Q^{-1} I_t Q$ followed by a single application of Q, it is possible to reach the t-state with certainty.

I claim:

1. An arrangement comprising:
   a data store capable of containing one or more of $2^n$ states;
   a processor for transforming data contained in said data store a preselected number of times with a transform Q having the form $-I_s U^{-1} V^{-1} I_t V U$, followed by a transforming of data contained in said data stores with a transform having the form VU,
   where U is a unitary transformation, V is a unitary transformation, $I_s$ is a diagonal matrix that characterizes a starting state s of data stored in said data store, $I_t$ is a diagonal matrix that characterizes a terminating state t of data stored in said data store, which corresponds to a desired solution, where either said starting state is any state other than the zero state, or said transform VU is any transform other than the Walsh Hadamard transform.

2. The arrangement of claim 1 where transformation U equals $$\begin{bmatrix} \sqrt{1-\frac{1}{\alpha}} & \frac{1}{\sqrt{\alpha}} \\ \frac{1}{\sqrt{\alpha}} & -\sqrt{1-\frac{1}{\alpha}} \end{bmatrix},$$

where $\alpha$ is a positive real number greater than 1.

3. The arrangement of claim 1 where $\alpha=2$.

4. The arrangement of claim 1 where $\alpha=n/k$ and k is an integer less than n.

5. The arrangement of claim 1 where said selected number of times is on the order of $1/|U_{ts}|$, where $|U_{ts}|$ is the amplitude of reaching said terminating state t from said starting state s.

6. The arrangement of claim 5 where said selected number of times corresponds to an integer nearest to $$\frac{\pi}{4|U_{ts}|}.$$

7. The arrangement of claim 1 where $I_s$ is a diagonal matrix with +1's along the diagonal at all positions except along the diagonal in a row that corresponds to said starting state, where it is −1.

8. The arrangement of claim 1 where $I_t$ is a diagonal matrix with +1's along the diagonal at all positions, except along the diagonal in a row that corresponds to said terminating state, where it is −1.

9. The arrangement of claim 1 where said transforms $I_s$ and $I_t$ performs selective rotation.

10. The arrangement of claim 9 where said rotations effect inversions.

11. The arrangement of claim 1 where said data store is a quantum mechanical system that is in a superposition of $2^n$ states, and said processor performs transformations on said amplitudes of said states.

12. A method for moving a quantum mechanical physical system which exists in a superposition of a plurality of states, from a starting state, to a terminating state, comprising the steps of:
   computing a measure $|U_{ts}|^2$, which corresponds to the probability of said system reaching a desired target state t, when starting at a state s, upon a single application of an operator U that is a unitary $2^n \times 2^n$ matrix, where n is the number of qubits in said system;
   starting at said starting state, applying an operator $Q=-I_s U^{-1} I_t U$ a number of times corresponding to $\eta$, which is an integer nearest to $$\frac{\pi}{4|U_{ts}|},$$

where, $I_s$ is a $2^n \times 2^n$ diagonal matrix and $I_t$ is a $2^n \times 2^n$ diagonal matrix; and
   applying operator U to place said system at a state where amplitude of said system at terminating state t is essentially equal to 1;
   where said starting state is any state other than the zero state, or said opertor U is other than the Walsh Hadamard transform.

13. The method of claim 12 further comprising the step of determining state of said quantum mechanical system after execution of said step of applying operator U.

14. The method of claim 12 where U is a $2^n \times 2^n$ matrix of elements, constructed from n repeated applications of a 2×2 matrix containing a $$\sqrt{1-\frac{1}{\alpha}}$$

term and a $$-\sqrt{1-\frac{1}{\alpha}}$$

on the diagonal, $$\frac{1}{\sqrt{\alpha}}$$

terms on other than the diagonal.

15. The method of claim 12 where $\alpha=2$.

16. The method of claim 12 where $\alpha=n/k$ and k is an integer less than n.

17. The method of claim 12 where U=WRW, where W is a Walsh-Hadamard transform, and R is a diagonal selective inversion matrix.

18. The method of claim 12 where U=WRW, where W is a matrix comprising elements $$\frac{\pm 1}{2^{n/2}}$$

with columns that are orthogonal to each other, and R is a diagonal selective inversion matrix.

* * * * *